(12) United States Patent
Erbele

(10) Patent No.: US 12,533,787 B2
(45) Date of Patent: Jan. 27, 2026

(54) HAND-HELD POWER TOOL

(71) Applicant: Robert Bosch GmbH, Stuttgart (DE)

(72) Inventor: Simon Erbele, Nufringen (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 18/520,736

(22) Filed: Nov. 28, 2023

(65) Prior Publication Data
US 2024/0173841 A1 May 30, 2024

(30) Foreign Application Priority Data

Nov. 30, 2022 (DE) ...................... 10 2022 212 845.1

(51) Int. Cl.
*B25F 5/00* (2006.01)
*B25B 21/02* (2006.01)

(52) U.S. Cl.
CPC .............. *B25F 5/001* (2013.01); *B25B 21/02* (2013.01)

(58) Field of Classification Search
CPC ............................ B25D 2211/006; B25F 1/00
See application file for complete search history.

(56) References Cited

U.S. PATENT DOCUMENTS

| | | |
|---|---|---|
| 2010/0107824 A1 | 5/2010 | Hanspers et al. |
| 2018/0147711 A1* | 5/2018 | Saur .................. B25F 5/001 |
| 2018/0222022 A1* | 8/2018 | Kumagai ............. B25D 11/104 |
| 2020/0047322 A1 | 2/2020 | Ito |
| 2022/0274243 A1 | 9/2022 | Rönblom |

FOREIGN PATENT DOCUMENTS

| | | |
|---|---|---|
| DE | 10 2012 224 444 A1 | 7/2014 |
| DE | 10 2017 211 778 A1 | 1/2018 |
| DE | 10 2016 223 678 A1 | 5/2018 |
| DE | 10 2020 118 169 A1 | 1/2021 |
| DE | 10 2020 208 347 A1 | 3/2021 |
| EP | 1 675 703 B1 | 4/2008 |
| EP | 2 505 307 A2 | 10/2012 |
| WO | 2018/011207 A1 | 1/2018 |

OTHER PUBLICATIONS https://www.theengineeringchoice.com/lathe-machine-operations-and-cutting-tools/ (Year: 2021).*

* cited by examiner

*Primary Examiner* — Daniel Jeremy Leeds
(74) *Attorney, Agent, or Firm* — Maginot, Moore & Beck LLP

(57) ABSTRACT

A hand-held power tool includes a drive motor with a drive shaft, and a transmission which can be actuated by the drive shaft. The transmission has an intermediate shaft into which the drive shaft at least partially projects. The power tool also includes at least one drive shaft bearing arranged radially between the drive shaft and the intermediate shaft, and a tool holder which can be actuated by the drive shaft. The drive shaft further includes at least one support element, which is designed to support the drive shaft bearing in the direction of the tool holder.

14 Claims, 2 Drawing Sheets

HAND-HELD POWER TOOL

This application claims priority under 35 U.S.C. § 119 to application no. DE 10 2022 212 845.1, filed on Nov. 30, 2022 in Germany, the disclosure of which is incorporated herein by reference in its entirety.

The present disclosure relates to a hand-held power tool.

BACKGROUND

DE 10 2020 208 347 A1 discloses a hand-held power tool with a tool holder and a housing in which at least one transmission unit and an electronically commutated drive motor with a stator and a rotor for actuating an insertion tool, which can be arranged in the tool holder, are arranged, wherein a transmission flange on the drive side is assigned to the transmission unit.

SUMMARY

The present disclosure proceeds from a hand-held power tool with a drive motor, which comprises a drive shaft, having a transmission which can be actuated by means of the drive shaft, wherein the transmission has an intermediate shaft into which the drive shaft projects at least partially, with at least one drive shaft bearing which is arranged radially between the drive shaft and the intermediate shaft, and with a tool holder which can be actuated by means of the drive shaft. It is recommended that the drive shaft has at least one support element, which is designed to support the drive shaft bearing in the direction of the tool holder.

The disclosed arrangement provides a compact hand-held power tool in that the drive shaft bearing is supported on the support element in the direction of the tool holder.

The hand-held power tool can be configured as an electrically operated hand-held power tool. The electrically operated hand-held power tool can be configured as a mains-operated or a cordless hand-held power tool. For example, the hand-held power tool can be designed as a screwdriver, a drill driver, or a rotary impact wrench.

The drive motor can be configured as an electrically commutated drive motor, in particular as at least one electric motor. The drive motor is configured such that it can be actuated via a manual switch. When the manual switch is actuated by a user, the drive motor is switched on and the hand-held power tool is put into operation. If the manual switch is not further actuated by the user, the drive motor is switched off. The drive motor can preferably be electronically controlled and/or regulated in such a way that a reversing mode and a specification for a desired rotational speed can be implemented. In reversing mode, the drive motor can be switched between a clockwise direction of rotation and a counterclockwise direction of rotation. To switch the drive motor in reversing mode, the hand-held power tool can comprise a rotation direction switching element, in particular a rotation direction changeover switch.

The drive motor has the drive shaft. The drive shaft is mounted in a housing of the hand-held power tool by means of at least the drive shaft bearing. The drive motor can actuate at least the transmission by means of the drive shaft. In addition, the drive motor can actuate the intermediate shaft, a percussion mechanism, and/or the tool holder by means of the drive shaft. The drive shaft bearing can, for example, be designed as a ball bearing, a rolling bearing, or a slide bearing. The drive shaft bearing is arranged at an end of the drive motor facing the tool holder. The drive shaft bearing is arranged radially between the drive shaft and the intermediate shaft, in particular an inner circumference of the intermediate shaft. The drive shaft protrudes into the intermediate shaft. The drive shaft bearing can be arranged in the intermediate shaft such that the drive shaft is mounted in the intermediate shaft by means of the drive shaft bearing. The drive shaft can have a further drive shaft bearing, which is arranged on an end facing away from the drive motor. The drive shaft can then be mounted in the housing such that it can rotate by means of the drive shaft bearing and the other drive shaft bearing. The transmission can have a transmission cover, whereby the transmission cover can be arranged axially between the drive motor and the percussion mechanism. The drive shaft can protrude into the transmission cover and/or engage in the transmission cover. The hand-held power tool can have a tool axis. An axis of rotation of the drive shaft can form the tool axis. In particular, "axial" should be understood as essentially parallel to the tool axis. Whereas "radial" should be understood as essentially perpendicular to the tool axis.

The transmission has the intermediate shaft. The drive motor can be designed to actuate the intermediate shaft. For this purpose, the drive motor and the intermediate shaft can be interconnected by means of the drive shaft and the transmission. The intermediate shaft can be arranged between the drive motor and the tool holder. The intermediate shaft can have at least one intermediate shaft bearing, which is arranged at least partially and/or, in sections, radially between the intermediate shaft, in particular an outer circumference of the intermediate shaft, and the transmission cover, in particular an inner circumference of the transmission cover. The intermediate shaft can have a receptacle for the intermediate shaft bearing, whereby the receptacle for the intermediate shaft bearing can be formed on the outer circumference of the intermediate shaft. The intermediate shaft bearing can, for example, be designed as a ball bearing, a needle bearing, or a slide bearing. The drive shaft bearing and the intermediate shaft bearing can be coaxial to the tool axis.

The transmission can be configured as one planetary transmission, in which case it can, for example, be shiftable. The planetary transmission can have at least one planetary stage. In a shiftable transmission, it is possible to switch between at least two gear stages by means of at least one gear shifting element, in particular a gear shifter. The transmission has a transmission cover. The transmission cover is designed to close off the transmission from the drive motor, at least in sections. The transmission cover can be arranged, in particular axially, between the planetary transmission, in particular the planetary stage, and the drive motor. The transmission, in particular the planetary transmission, can have a ring gear. It is conceivable, for example, that the ring gear and the transmission cover are integrated so as to form one piece. It is possible that the intermediate shaft forms a planetary carrier of the planetary transmission.

The percussion mechanism is designed to be operated in a percussive operating mode. In the percussive operating mode, the percussion mechanism generates high torque peaks to loosen stuck connecting means or tighten connecting means. The percussion mechanism has a beater and a percussion spring connected to the beater so that it cannot rotate. The percussion mechanism can be connected to the drive motor by means of the transmission. The percussion mechanism may, for example, be designed as a rotary percussion mechanism or a V-groove percussion mechanism. The percussion mechanism can be actuated by the intermediate shaft. The percussion mechanism can be arranged between the drive motor and the tool holder. The percussion mechanism has a percussion mechanism housing in which the beater and the percussion spring are arranged. The percussion mechanism also has a percussion mechanism cover. The percussion mechanism cover can close off the percussion mechanism in the direction of the drive motor. The percussion mechanism cover can be arranged between the drive motor and the tool holder, in particular the intermediate shaft, especially the transmission. It is possible that the percussion mechanism cover and the transmission cover are integrated so as to form one piece, so that the percussion mechanism cover forms the ring gear.

The tool holder can be configured as an internal tool holder, for example a bit holder, and/or as an external tool holder, for example a socket holder. It is also conceivable that the tool holder is configured as a drill chuck. The tool holder can accommodate insert tools, such as screwdriver bits or sockets, so that a user can make screw connections between a fastener and a fastener holder.

The hand-held power tool further includes a power supply, wherein the power supply is provided for cordless operation by means of rechargeable batteries, in particular hand-held power tool rechargeable battery packs, and/or for mains operation. In a preferred embodiment, the power supply is configured for cordless operation. In the context of the present disclosure, a "hand-held power tool rechargeable battery pack" is intended to be understood as a combination of at least one rechargeable battery cell and a rechargeable battery pack housing. The hand-held power tool rechargeable battery pack is advantageously configured for supplying power to commonly available cordless hand-held power tools. The at least one rechargeable battery cell can, for instance, be configured as a Li-ion rechargeable battery cell having a nominal voltage of 3.6 V. The hand-held power tool rechargeable battery pack can include up to ten rechargeable battery cells, for example, although a different number of rechargeable battery cells is conceivable too. Both an embodiment as a cordless hand-held power tool and operation as a mains-operated hand-held power tool are sufficiently well-known to the person skilled in the art, so the specifics of the power supply will not be discussed here.

The hand-held power tool can have an electronics unit at least for controlling the drive motor. The electronics unit can be arranged in the housing. In addition, the electronics unit can be arranged along the tool axis between the transmission and the drive motor. The electronics unit can, for example, be designed as a Hall circuit board for detecting motor signals.

The housing of the hand-held power tool is designed to at least partially accommodate the tool holder, the drive motor, the transmission, the intermediate shaft, and the percussion mechanism. The housing can be designed as a shell housing with two half shells.

The drive shaft has at least the support element. The support element is designed to support the drive shaft bearing, in particular axially, in the direction of the tool holder. It is also possible for the drive shaft bearing to rest against the support element, in particular axially.

In one embodiment of the hand-held power tool, the support element is integrated with the drive shaft, so as to form one piece. This can increase the robustness of the drive shaft.

In one embodiment of the hand-held power tool, the support element is designed in the circumferential direction of the drive shaft. The support element can, for example, be designed as a web, a ramp, a projection, or an edge.

In one embodiment of the hand-held power tool, the drive shaft has at least one milling section, and a milling outlet of the milling section forms the support element. The milling section can at least partially extend into the transmission. It is also possible for the milling section to be arranged inside the transmission. The planetary transmission includes planetary wheels. The milling section is designed to transmit rotation of the drive shaft to the planetary wheels. For this purpose, the milling section forms gearing with the planetary wheels.

In one embodiment of the hand-held power tool, the diameter of the milling outlet is smaller than 20 mm, in particular smaller than 15 mm, especially smaller than 12 mm. This enables the shortest possible milling outlet to be provided.

In one embodiment of the hand-held power tool, the drive shaft bearing is supported on the support element by means of a drive shaft bearing inner ring. The drive shaft bearing inner ring lies against the support element in the circumferential direction. It is possible for the drive shaft bearing inner ring to form an interlocking, non-positive, and/or substance-to-substance bond with the drive shaft. The drive shaft bearing inner ring is supported axially by means of an edge on the support element. It is conceivable that the drive shaft bearing inner ring rests axially against the support element.

In one embodiment of the hand-held power tool, the intermediate shaft has at least, in particular on the inner circumference of the intermediate shaft, a shoulder on which the drive shaft bearing, in particular a drive shaft bearing outer ring of the drive shaft bearing, is supported in the direction of the tool holder. The intermediate shaft forms the shoulder on the inner circumference. The shoulder can be at least partially and/or in portions circumferential. It is possible for the shoulder to be integrated with the intermediate shaft so as to form one piece. In addition to the drive shaft bearing inner ring, the drive shaft bearing also has the drive shaft bearing outer ring. The drive shaft bearing outer ring is supported axially in the direction of the tool holder on the shoulder of the intermediate shaft. The drive shaft bearing outer ring may be in contact with the shoulder.

In one embodiment of the hand-held power tool, the drive motor has at least one spacer element which is designed to support the drive shaft bearing, in particular axially, in the direction of the drive motor. The spacer element is arranged, in particular axially, in the direction of the tool holder. In addition, the spacer element can be arranged around the drive shaft in the circumferential direction so that the spacer element at least partially encloses the drive shaft.

In one embodiment of the hand-held power tool, the drive shaft bearing is arranged axially, in particular along the tool axis, between the spacer element and the support element. The drive shaft bearing is secured axially in the direction of the tool holder by means of the support element of the drive shaft. Furthermore, the drive shaft bearing is secured in the direction of the drive motor by means of the spacer element. The drive shaft bearing is supported by the support element and the spacer element. It is also possible for the drive shaft bearing to rest against the support element and the spacer element.

In one embodiment of the hand-held power tool, the spacer element has a collar on which the drive shaft bearing is supported by means of a drive shaft bearing inner ring. The collar is at least partially circumferential. Furthermore, the collar can be integrated with the spacer element so as to form one piece. The drive shaft bearing inner ring rests against the support element and the collar. This secures the drive shaft bearing inner ring axially in the direction of the tool holder and the drive motor. The spacer element can, for example, be designed as a spacer disc or a motor spacer.

BRIEF DESCRIPTION OF THE DRAWINGS

The disclosure is explained in more detail in the following with reference to a preferred embodiment. In the following, the drawings show.

DETAILED DESCRIPTION

Figure 1:
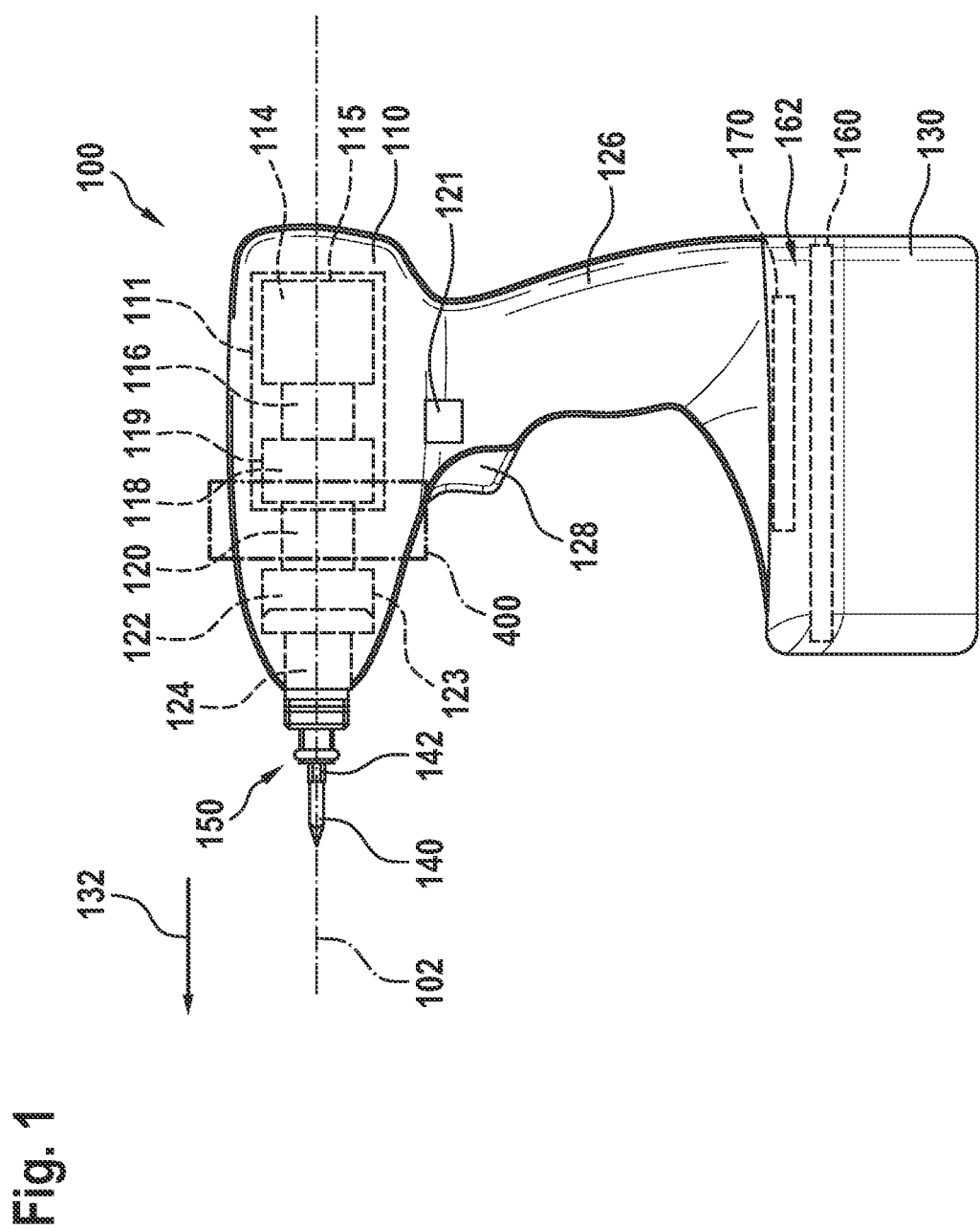
FIG. 1 a schematic view of a hand-held power tool according to the disclosure.

FIG. 1 shows a hand-held power tool 100 according to the disclosure, which is configured here for example as a cordless rotary impact screwdriver. The hand-held power tool 100 comprises an output shaft 124, a tool holder 150, and a percussion mechanism 122, for example a rotary or rotational percussion mechanism. The hand-held power tool 100 comprises a housing 110 with a handle 126. To provide a mains-independent power supply, the hand-held power tool 100 can be mechanically and electrically connected to a power supply for cordless operation, so that the hand-held power tool 100 is configured as a cordless hand-held power tool 100. A hand-held power tool rechargeable battery pack 130 is used here as the power supply. The present disclosure is not limited to cordless hand-held power tools, however, but can also be used for mains-dependent, i.e., mains-powered, hand-held power tools.

The housing 110 comprises a drive unit 111 and the percussion mechanism 122, wherein the drive unit 111 and the percussion mechanism 122 are arranged in the housing 110. The drive unit 111 comprises an electrically commutated drive motor 114, which is supplied with power by the hand-held power tool rechargeable battery pack 130, and a transmission 118. The transmission 118 is designed as at least one planetary transmission 166, see also FIG. 2. The drive motor 114 is designed such that it can be actuated, for example via a manual switch 128, so that the drive motor 114 can be switched on and off. The drive motor 114 can advantageously be electronically controlled and/or regulated, so that a reversing mode and a desired rotational speed can be implemented. For the reversing mode, the hand-held power tool 100 comprises a rotation direction switching element 121 configured as a rotation direction changeover switch. The rotation direction switching element 121 is configured to switch the drive motor 114 between a clockwise direction of rotation and a counterclockwise direction of rotation. The design and function of a suitable drive motor are well known to the person skilled in the art, which is why they will not be discussed in detail here.

The transmission 118 is connected to the drive motor 114 via a drive shaft 116. The drive shaft 116 is mounted in the housing 110 by means of a drive shaft bearing 117. In this example, the drive shaft bearing 117 is designed as a ball bearing. The drive shaft bearing 117 is arranged radially between the drive shaft 116 and an inner circumference of the intermediate shaft 120, see also FIG. 2. The transmission 118 is provided for converting a rotation of the drive shaft 116 into a rotation between the transmission 118 and the percussion mechanism 122 via an intermediate shaft 120. Preferably, this conversion takes place in such a way that the intermediate shaft 120 rotates relative to the drive shaft 116 with increased torque, but at a reduced rotational speed, see also FIG. 2. The intermediate shaft 120 at least partially actuates the percussion mechanism 122. The transmission 118 has a transmission housing 119, which is arranged in the housing 110. The hand-held power tool 100 comprises a tool axis 102, whereby here an axis of rotation of the drive shaft 116 forms the tool axis 102. The drive shaft bearing 117 is arranged radially to the tool axis 102 between the drive shaft 116 and the intermediate shaft 120.

Figure 2:
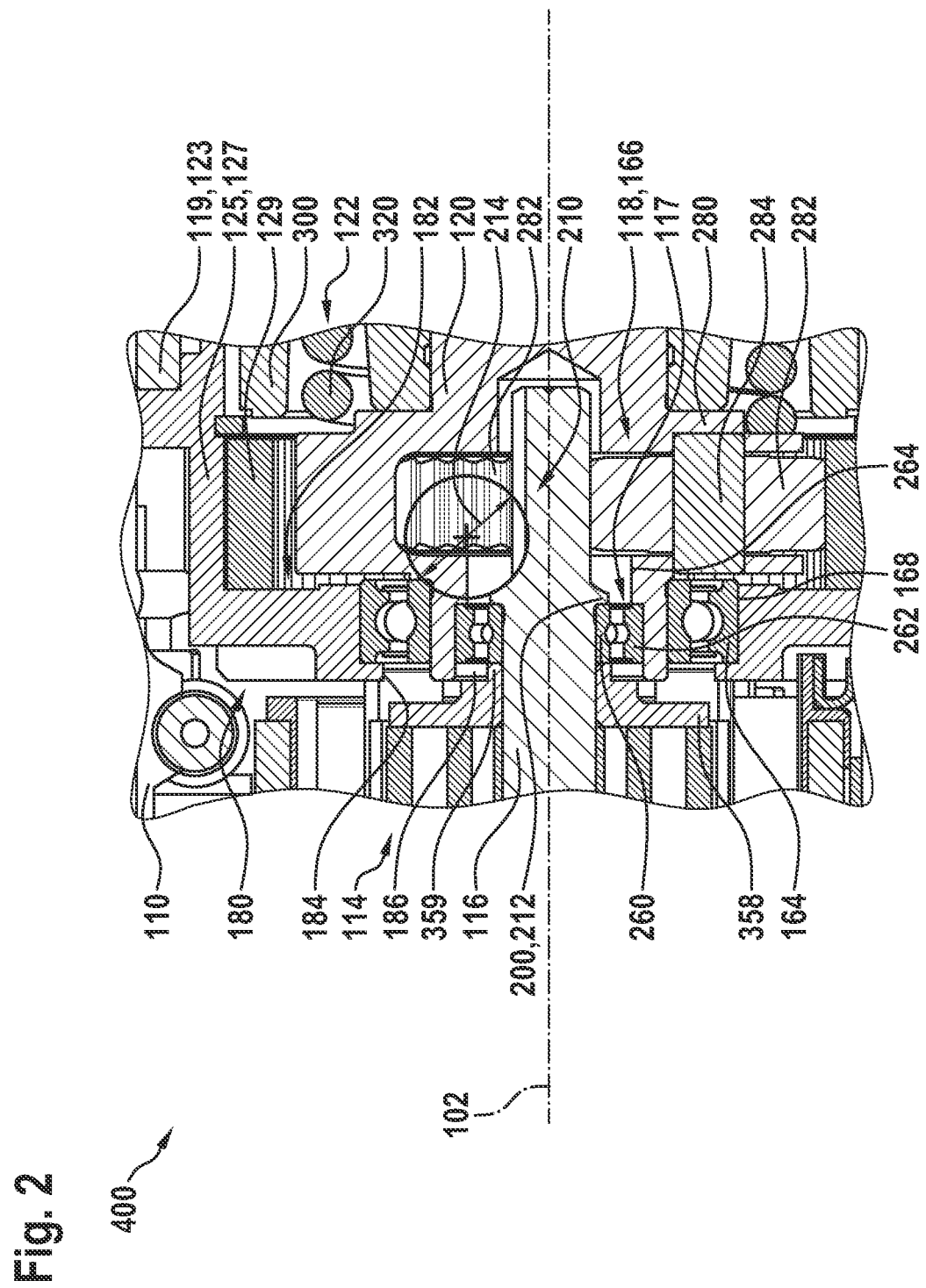
FIG. 2 a section of a longitudinal cross-section of the hand-held power tool.

The percussion mechanism 122 is connected to the intermediate shaft 120 and comprises a beater 300 and a percussion spring 320, wherein the percussion mechanism 122 generates impact-like rotary pulses with high intensity during an impact operation, see also FIG. 2. The percussion mechanism 122 comprises a percussion mechanism housing 123, wherein the percussion mechanism 122 can also be arranged in another suitable housing, such as the transmission housing 119. The percussion mechanism 122 is designed to actuate the output shaft 124. The tool holder 150 is provided on the output shaft 124. The tool holder 150 is preferably integrally formed with and/or configured on the output shaft 124. The tool holder 150 is preferably disposed in an axial direction 132 facing away from the drive unit 111. The tool holder 150 is configured here as a hexagon socket, in the form of a bit holder, which is provided to accommodate an insert tool 140. The insert tool is configured in the form of a screwdriver bit comprising a polygonal external coupling 142. The type of the screwdriver bit, for example HEX type, is sufficiently well-known to the person skilled in the art. The present disclosure is not limited to the use of HEX screwdriver bits, however; other tool holders that appear useful to those skilled in the art, such as HEX drills, SDS quick-insert tools, or round-shank drill chucks, can be used as well. In addition, the person skilled in the art is well aware of the structure and function of a suitable bit holder.

The hand-held power tool 100 has a control unit 170 at least for controlling the drive unit 111, in particular the drive motor 114. The housing 110 at least partially accommodates the control unit 170. The control unit 170 has a microprocessor, which is not shown in detail. In addition, the housing 110 comprises a power supply holding device 160. The power supply holding device 160 accommodates the hand-held power tool rechargeable battery pack 130 and forms a base 162 comprising a standing surface. The hand-held power tool rechargeable battery pack 130 can be released from the power supply holding device 160 without tools. The housing 110 also comprises the handle 126 and the power supply holding device 160. The handle 126 can be grasped by the user. In one embodiment, the power supply holding device 160 is disposed on the handle 126. The hand-held power tool 100 can be set down on the base 162.

FIG. 2 shows a section 400 of a longitudinal cut of the hand-held power tool 100. The percussion mechanism 122, the intermediate shaft 120, and the transmission 118 are shown, with the intermediate shaft 120 forming part of the transmission 118 as an example. The intermediate shaft 120 is arranged between the drive motor 114 and the tool holder 150, whereby the tool holder 150 is not shown. The transmission 118 is formed as the planetary transmission 166, with a planetary stage being formed here as an example. In addition to the transmission housing 119, the transmission 118 comprises a transmission cover 125. Here, the transmission cover 125 is intended to at least partially close the transmission 118 with respect to the drive motor 114. In this case, the transmission cover 125 is arranged between the planetary transmission 166 and the drive motor 114. In addition, the planetary transmission 166 comprises a ring gear 129. The intermediate shaft 120 has an intermediate shaft bearing 164, which is designed as a ball bearing by way of example. The transmission cover 125 comprises a receptacle 168 for the intermediate shaft bearing 164, such that the receptacle 168 for the intermediate shaft bearing 164 receives the intermediate shaft bearing 164. The intermediate shaft bearing 164 is arranged at least partially and/or in sections radially between an outer circumference of the intermediate shaft 120 and an inner circumference of the transmission cover 125. The receptacle 168 for the intermediate shaft bearing 164 is formed on the outer circumference of the intermediate shaft 120. The drive shaft bearing 117 and the intermediate shaft bearing 164 are arranged coaxially to the tool axis 102. Here, the drive shaft bearing 117 and the intermediate shaft bearing 164 are arranged overlapping one another in sections. The drive shaft 116 protrudes into the transmission cover 125. The transmission cover 125 comprises an end face 180 facing the drive motor 114. The end face 180 of the transmission cover 125 faces in the direction of the drive motor 114. The transmission cover 125 comprises a further end face 182. The other end face 182 faces the striking mechanism 122. The transmission cover 125 comprises a through-opening 184. The drive shaft 116 protrudes into the through-opening 184. In this example, the through-opening 184 is circular in shape. The intermediate shaft bearing 164 is arranged at least partially at the through-opening 184.

The percussion mechanism 122 is connected to the drive motor 114 by means of the planetary transmission 166. The percussion mechanism 122 is shaped here as a V-groove percussion mechanism. The percussion mechanism 122 is arranged between the drive motor 114 and the tool holder 150. The beater 300 and the percussion spring 320 are arranged in the percussion mechanism housing 123. The percussion mechanism 122 comprises a percussion mechanism cover 127, wherein the percussion mechanism cover 127 closes off the percussion mechanism 122 in the direction of the drive motor 114. The percussion mechanism cover 127 is arranged between the drive motor 114 and the planetary transmission 166. Here, for example, the percussion mechanism cover 127 and the transmission cover 125 are integrated so as to form one piece.

The planetary transmission 166 comprises a planetary carrier 280. In addition to the planetary carrier 280, the planetary transmission 166 comprises a plurality of planetary wheels 282 and bearing pins 284. The bearing pins 284 are intended to rotatably connect the planetary wheels 282 to the planetary carrier 280. By way of example, the intermediate shaft 120 and the planetary carrier 280 are integrated so as to form one piece.

The drive shaft 116 comprises a support element 200. The support element 200 is intended to support the drive shaft bearing 117 axially in the direction of the tool holder 150. Here, the drive shaft bearing 117 lies axially against the support element 200. The support element 200 is integrated with the drive shaft 116 so as to form one piece and in the circumferential direction of the drive shaft 116. The support element 200 is shaped, for example, as a type of ramp. The drive shaft 116 comprises a milling section 210. The milling section 210 comprises a milling outlet 212, wherein the milling outlet 212 forms the support element 200. The milling section 210 extends at least partially into the transmission 118 and is disposed substantially within the transmission 118. The milling section 210 forms gear teeth with the planetary wheels 282. The milling outlet 212 comprises a diameter 214. The diameter 214 of the milling outlet 212 is smaller than 20 mm, in particular smaller than 15 mm, especially smaller than 12 mm.

The drive shaft bearing 117 is supported axially on the support element 200 by means of a drive shaft bearing inner ring 260. Furthermore, the drive shaft bearing inner ring 260 rests against the support element 200 in the circumferential direction. In this case, the drive shaft bearing inner ring 260 is frictionally connected to the drive shaft 116. Furthermore, the drive shaft bearing inner ring 260 lies axially against the support element 200 by means of an edge.

The intermediate shaft 120 forms a shoulder 264 on the inner circumference of the intermediate shaft 120. A drive shaft bearing outer ring 262 of the drive shaft bearing 117 lies axially against the shoulder 264 in the direction of the tool holder 150. The shoulder 264 is formed at least partially and/or, in sections, circumferentially and is integrated with the intermediate shaft 120 so as to form one piece.

The drive motor 114 comprises at least one spacer element 358. The spacer element 358 is intended to support the drive shaft bearing 117, in particular axially, in the direction of the drive motor 114. The spacer element 358 is arranged in the circumferential direction around the drive shaft 116. The drive shaft bearing 117 is arranged axially between the spacer element 358 and the support element 200. The drive shaft bearing 117 lies axially against the support element 200 and the spacer element 358. The spacer element 358 comprises a collar 359. The drive shaft bearing inner ring 260 lies axially against the collar 359. The collar 359 is formed at least partially circumferentially and is integrated with the spacer element 358 so as to form one piece. The spacer element 358 is formed, for example, as a spacer disc.

The invention claimed is:

1. A hand-held power tool comprising:
   a drive motor having a drive shaft;
   a transmission configured to be actuated by the drive shaft, the transmission having an intermediate shaft into which the drive shaft at least partially projects;
   at least one drive shaft bearing arranged radially between the drive shaft and the intermediate shaft; and
   a tool holder configured to be actuated by the drive shaft,
   wherein the drive shaft includes at least one support element that is integrally formed in one piece with the drive shaft, and
   wherein the at least one support element is configured to support the at least one drive shaft bearing on a side of the at least one drive shaft bearing that faces toward the tool holder.

2. The hand-held power tool according to claim 1, wherein the at least one support element extends in a circumferential direction with respect to the drive shaft.

3. The hand-held power tool according to claim 1, wherein the drive shaft has at least one milling section, and a milling outlet of the at least one milling section that projects radially outwardly from the drive shaft forms the at least one support element.

4. The hand-held power tool according to claim 3, wherein the milling outlet has a diameter on a side facing away from the at least one drive shaft bearing that is smaller than 20 mm.

5. The hand-held power tool according to claim 1, wherein the at least one drive shaft bearing is supported on the at least one support element by a drive shaft bearing inner ring.

6. The hand-held power tool according to claim 1, wherein the intermediate shaft has at least one shoulder on which the at least one drive shaft bearing is supported on the side facing toward the tool holder.

7. The hand-held power tool according to claim 1, wherein the drive motor has at least one spacer element configured to support the at least one drive shaft bearing in a direction of the drive motor.

8. The hand-held power tool according to claim 7, wherein the at least one drive shaft bearing is arranged, in an axial direction of the drive shaft, between the at least one spacer element and the at least one support element.

9. The hand-held power tool according to claim 7, wherein the at least one spacer element has a collar on which the at least one drive shaft bearing is supported by a drive shaft bearing inner ring.

10. The hand-held power tool according to claim 4, wherein the diameter of the milling outlet is less than 15 mm.

11. The hand-held power tool according to claim 10, wherein the diameter of the milling outlet is less than 12 mm.

12. The hand-held power tool according to claim 6, wherein a drive shaft bearing outer ring of the at least one drive shaft bearing is supported on the at least one shoulder on the side of the at least one drive shaft bearing facing toward the tool holder.

13. The hand-held power tool according to claim 3, wherein the at least one milling section forms gear teeth that engage planetary wheels of the transmission.

14. The hand-held power tool according to claim 13, wherein the at least one support element is formed as a ramp extending form the at least one milling section and projecting radially outwardly from the drive shaft.

* * * * *